United States Patent
Baker

(10) Patent No.: US 9,432,315 B2
(45) Date of Patent: *Aug. 30, 2016

(54) SYSTEM AND METHOD FOR THE AUTOMATED NOTIFICATION OF COMPATIBILITY BETWEEN REAL-TIME NETWORK PARTICIPANTS

(71) Applicant: Jedi Technologies, Inc., Tucson, AZ (US)

(72) Inventor: Benjamin D. Baker, Tucson, AZ (US)

(73) Assignee: Jedi Technologies, Inc., Tucson, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 14/560,108

(22) Filed: Dec. 4, 2014

(65) Prior Publication Data
US 2015/0088996 A1    Mar. 26, 2015

Related U.S. Application Data

(63) Continuation of application No. 13/854,983, filed on Apr. 2, 2013, now Pat. No. 8,930,406, which is a continuation of application No. 13/018,344, filed on Jan. 31, 2011, now Pat. No. 8,417,729, which is a (Continued)

(51) Int. Cl.
*G06F 17/30* (2006.01)
*H04L 12/58* (2006.01)
(Continued)

(52) U.S. Cl.
CPC ......... *H04L 51/04* (2013.01); *G06F 17/30286* (2013.01); *G06Q 30/02* (2013.01);
(Continued)

(58) Field of Classification Search
CPC .............. G06F 17/30734; G06F 17/30731; H04L 51/04; H04L 12/1818; H04L 12/185; H04L 67/306; H04L 67/18; H04L 69/306; H04L 69/329; H04W 4/02; H04W 4/18; G06Q 30/02; Y10S 707/99936; Y10S 707/99945; Y10S 707/998937; Y10S 707/99948

USPC ............... 707/793, 794, 796, 802, 922, 966; 709/204, 207, 217–219, 227–228; 715/751, 753, 758

See application file for complete search history.

(56) References Cited

U.S. PATENT DOCUMENTS

| 4,483,680 A | 11/1984 | Daly |
| 5,086,394 A | 2/1992 | Shapira |

(Continued)

FOREIGN PATENT DOCUMENTS

| AU | 2001243275 | 2/2001 |
| CA | 2419428 | 6/2001 |

(Continued)

OTHER PUBLICATIONS

Leonard N Foner., Yenta: a multi-agent, referral-based matchmaking system, 1997, ACM, 301-307.*

(Continued)

*Primary Examiner* — Jean B Fleurantin
(74) *Attorney, Agent, or Firm* — Duane C. Basch; Basch & Nickerson LLP

(57) ABSTRACT

The present invention is a method and system for using predetermined preferences/characteristics to ascertain personal compatibility between network or chat room participants based upon profile information. When the system determines that these preferences are favorable for interpersonal compatibility, the system will automatically notify or page the participants so as to facilitate their introduction. Further functionality, aside from the compatibility based upon profile information, includes e-mail and other electronic notification of personal compatibility as well as geographic compatibility.

10 Claims, 8 Drawing Sheets

Related U.S. Application Data continuation of application No. 12/021,374, filed on Jan. 29, 2008, now Pat. No. 7,885,977, which is a continuation of application No. 09/793,364, filed on Feb. 26, 2001, now Pat. No. 7,401,098.

(60) Provisional application No. 60/185,858, filed on Feb. 29, 2000.

(51) Int. Cl.

| | |
|---|---|
| *G06Q 30/02* | (2012.01) |
| *H04L 12/18* | (2006.01) |
| *H04W 4/02* | (2009.01) |
| *H04W 4/18* | (2009.01) |
| *H04L 29/08* | (2006.01) |

(52) U.S. Cl.
CPC ........... *H04L12/1818* (2013.01); *H04L 67/18* (2013.01); *H04L 67/306* (2013.01); *H04W 4/02* (2013.01); *H04W 4/18* (2013.01); *H04L 12/185* (2013.01); *H04L 69/329* (2013.01); *Y10S 707/99936* (2013.01); *Y10S 707/99937* (2013.01); *Y10S 707/99945* (2013.01); *Y10S 707/99948* (2013.01)

(56) References Cited

U.S. PATENT DOCUMENTS

| | | | |
|---|---|---|---|
| 5,613,205 | A | 3/1997 | Dufour |
| 5,625,818 | A | 4/1997 | Zarmer et al. |
| 5,659,731 | A | 8/1997 | Gustafson |
| 5,764,916 | A | 6/1998 | Busey et al. |
| 5,775,695 | A | 7/1998 | Byers |
| 5,793,365 | A | 8/1998 | Tang et al. |
| 5,794,210 | A | 8/1998 | Goldhaber et al. |
| 5,796,395 | A | 8/1998 | de Hond |
| 5,813,006 | A | 9/1998 | Polnerow et al. |
| 5,828,839 | A | 10/1998 | Moncreiff |
| 5,838,927 | A | 11/1998 | Gillon et al. |
| 5,872,850 | A | 2/1999 | Klein et al. |
| 5,880,731 | A | 3/1999 | Liles et al. |
| 5,913,212 | A | 6/1999 | Sutcliffe et al. |
| 5,950,200 | A | 9/1999 | Sudai et al. |
| 5,952,959 | A | 9/1999 | Norris |
| 5,963,951 | A | 10/1999 | Collins |
| 6,041,311 | A | 3/2000 | Chislenko et al. |
| 6,052,122 | A | 4/2000 | Sutcliffe et al. |
| 6,058,367 | A | 5/2000 | Sutcliffe et al. |
| 6,061,716 | A | 5/2000 | Moncreiff |
| 6,073,105 | A | 6/2000 | Sutcliffe et al. |
| 6,073,138 | A | 6/2000 | de l'Etraz et al. |
| 6,081,830 | A | 6/2000 | Schindler |
| 6,167,395 | A | 12/2000 | Beck et al. |
| 6,181,736 | B1 | 1/2001 | McLaughlin et al. |
| 6,212,548 | B1 | 4/2001 | DeSimone et al. |
| 6,249,282 | B1 | 6/2001 | Sutcliffe et al. |
| 6,249,806 | B1 | 6/2001 | Kohda et al. |
| 6,263,212 | B1 | 7/2001 | Ross et al. |
| 6,272,467 | B1 | 8/2001 | Durand et al. |
| 6,363,352 | B1 | 3/2002 | Dailey et al. |
| 6,425,012 | B1 | 7/2002 | Trovato et al. |
| 6,480,885 | B1 | 11/2002 | Olivier |
| 6,490,601 | B1 | 12/2002 | Markus et al. |
| 6,513,036 | B2 | 1/2003 | Fruensgaard et al. |
| 6,519,771 | B1 | 2/2003 | Zenith |
| 6,542,882 | B1 | 4/2003 | Smith |
| 6,549,768 | B1 | 4/2003 | Fraccaroli |
| 6,559,863 | B1 | 5/2003 | Megiddo |
| 6,708,172 | B1 | 3/2004 | Wong et al. |
| 6,735,568 | B1 | 5/2004 | Buckwalter et al. |
| 6,760,731 | B2 | 7/2004 | Huff |
| 6,941,317 | B1 | 9/2005 | Chamberlin et al. |
| 7,006,616 | B1* | 2/2006 | Christofferson et al. .......... 379/202.01 |
| 7,401,098 | B2 | 7/2008 | Baker |
| 7,885,977 | B2 | 2/2011 | Baker |
| 2003/0014485 | A1* | 1/2003 | Banatwala .............. 709/204 |
| 2003/0093405 | A1 | 5/2003 | Mayer |
| 2006/0067500 | A1* | 3/2006 | Christofferson et al. .......... 379/202.01 |
| 2006/0167944 | A1 | 7/2006 | Baker |

FOREIGN PATENT DOCUMENTS

| | | |
|---|---|---|
| CA | 2400123 | 8/2008 |
| DE | 60129795 | 6/2008 |
| EP | 1259869 | 2/2007 |
| WO | WO9816045 | 4/1998 |
| WO | WO0016209 | 3/2000 |
| WO | WO0128171 | 4/2001 |
| WO | WO0165334 | 9/2001 |
| WO | WO0172020 | 9/2001 |
| WO | WO0197541 | 12/2001 |
| WO | WO0198856 | 12/2001 |
| WO | WO0201823 | 1/2002 |
| WO | WO0213053 | 2/2002 |
| WO | WO0213054 | 2/2002 |
| WO | WO0228125 | 4/2002 |
| WO | WO0229506 | 4/2002 |
| WO | WO02062092 | 8/2002 |

OTHER PUBLICATIONS

Re U.S. Pat. No. 7,401,098 etc.—Defendant Responses to First Set of Interrogatories dated Sep. 26, 2011.
Re U.S. Pat. No. 7,401,098 etc.—Defendant Responses to First Set of Interrogatories dated Sep. 26, 2011 _Exhibit A.
Re U.S. Pat. No. 7,401,098 etc.—Defendant Responses to First Set of Interrogatories dated Sep. 26, 2011 _Exhibit B.
Re U.S. Pat. No. 7,401,098 etc.—Defendant Responses to First Set of Interrogatories dated Sep. 26, 2011 _Exhibit C.
Re U.S. Pat. No. 7,401,098 etc.—Plaintiff Markham brief dated Jan. 17, 2012.
Re U.S. Pat. No. 7,401,098 etc.—Defendant Markham Reply Claims Construction dated Jan. 31, 2012.
Re U.S. Pat. No. 7,401,098 etc.—Plaintiff Markham Reply Brief dated Feb. 17, 2012.
"Fisch sucht Fahrrad" Ct, Online! vol. 18; 1999; pp. 1-3, XP002332437; www.heise.de.ct/99/18/068. Jun. 5, 2005.
"Adding Names to Your Buddy List," Netscape, (http://wp.netscape.com/support/books/netcenter/044000138.htm) Mar. 7, 2007.
"Creating a Personality," Netscape, (http://wp.netscape.com/support/books/netcenter/044000139.htm) Mar. 7, 2007.
"Editing Your Options," Netscape, (http://wp.netscape.corn/support/books/netcenter/044000140.htm) Mar. 7, 2007.
"Sending Instant Messages," Netscape, (http://wp.netscape.com/support/books/netcenter/044000141.htm) Mar. 7, 2007.
"Chatting with Buddy Chat," Netscape, (http://wp.netscape.cornisupport/books/netcenter/044000142.htm) Mar. 7, 2007.
Newsroom (press release), Time Warner, (http://www.timewarner.com/corp/newsroom/pr/0,20812.666482,00.htm 1) Mar. 7, 2007.
Mark S. Acherman et al., Social Activity Indicators for Groupware, 1996, IEEE, 37-42. Jun. 30, 1996.
Timothy W. Bickmore et al., Animated Autonomous Personal Representatives, 1998, ACM, 8-15. Dec. 12, 2007.
Kiersey, D; Bates, M.; Please Understand Me; 1984; pp. 4-13. Prometheus Nemesis Book Co., Del Mar, Callifornia Jan. 1, 1994.
Udate; Udate,com, "Who's Online" ;Oct. 31, 2002.
Prosecution history for Australian Patent AU2001243275 corresponding to U.S. Pat. No. 7,401,098, Feb. 26, 2001. Jul. 15, 2008.
Prosecution history for Canadian Patent CA2400123 corresponding to U.S. Pat. No. 7,401,098, Aug. 12, 2008. Jul. 15, 2008.
Prosecution history of European Patent EP1259869 corresponding to U.S. Pat. No. 7,401,098, Jun. 12, 2008. Jul. 15, 2008.
Acherman et al., Social Activity Indicators for Groupware, 1996, IEEE, 37-42. Jun. 1, 1996.

(56) References Cited

OTHER PUBLICATIONS

International Search report & Written Opinion for International Application PCT/US01/06023, corresponding to U.S. Pat. No. 7,401,098. Jul. 31, 2001.
Kiersey et al.; Please Understand Me; 5th Edition C. 1978 Kiersey and Bated; c. 1984 Gnosology Books. ISBN 0-9606954-0-0 Jan. 1, 1984.
Mathews, T.J.; Operation Match; The Harvard Crimson-Online Edition; Pub. Nov. 2, 1965.
Meyer, C.A.; The Computer Personals: Meeting Your Match Online; Link-Up Communications and the Small computer, vol. 1, No. 10, Jul. 1, 1984.
Operation Match; Compatibility Research, Inc.; 872 Massachusetts Ave, Cambridge, MA Jan. 1, 1996.
OperationMatchIsHere; The Tech; The Bulletin Board, p. 12; Oct. 13, 1965 Oct. 31, 1965.
Scharlott et al.; Overcoming Relationship Initiation Barriers: The Impact of a Computer-Dating System on Sec Role, Shyness, and Appearance Inhibitions; Computers in Human Behavior; vol. 11, No. 2, pp. 191-204; 1995 Elsevier Science Ltd. Jan. 1, 1995.
Brown; The Originals Matching them up; harvardmagaine.com online 030386html Jan. 1, 1965.
Zelitchenko, A.I.; Information Retrieval Expert System "Matchmaker"; Moscow State University; Computers in Human Behavior; vol. 8, pp. 281-296; 1992 Pergamon Press Ltd. Jan. 1, 1992.
The File History of U.S. Pat. No. 7,401,098 Jul. 14, 2010.
The File History of U.S. Appl. No. 90/010,360, in Re-examination of U.S. Pat. No. 7,401,098 Jul. 14, 2010.
U.S. Appl. No. 60/185,858 Jul. 14, 2010.
The file history of U.S. Appl. No. 11/328,428 Jul. 14, 2001.
U.S. Appl. No. 90/010,360 Re-Examination PA Exhibits Oct. 6, 2009.
Weverka, P.; Taylor, M.; ICQ for Dummies; IDG Books Worldwide, Inc., Foster City, CA 94404, c.1999; pp. 69, 71, 72, 73, 74, 105, 106 (Total pp. 9, including cover and copyright pgs.) Jan. 1, 1999.
David Vronay et al., Alternative interfaces for chat, Nov. 1999, ACM, 19-26. Nov. 1, 1999.
Nurmela et al., Evaluating CSCL log files by social network analysis, 1999, ACM, 12 pages. Jan. 1, 1999.
The File History of U.S. Appl. No. 90/010,360 in Re-examination of U.S. Pat. No. 7,404,098 issued Jul. 15, 2008; U.S. Appl. No. 09/793,364, filed Feb. 26, 2001; published as US 2001/0048449 A1, Inventor: Benjamin D. Baker. Jul. 15, 2008.
The File History of U.S. Pat. No. 7,885,977 issued Feb. 28, 2011; U.S. Appl. No. 12/021,374, filed Jan. 29, 2008; published Aug. 21, 2008 as US 2008/0201425 A1; Inventor: Benjamin D. Baker Feb. 28, 2011.
Leonard N. Foner, Yenta: A Multi-Agent, Referral-Based Matchmaking System, MIT Media, Lab, 7 pages. Dec. 11, 2012.

\* cited by examiner

SYSTEM AND METHOD FOR THE AUTOMATED NOTIFICATION OF COMPATIBILITY BETWEEN REAL-TIME NETWORK PARTICIPANTS

This application is a continuation of, and claims priority from co-pending U.S. patent application Ser. No. 13/854,983 for "SYSTEM AND METHOD FOR THE AUTOMATED NOTIFICATION OF COMPATIBILITY BETWEEN REAL-TIME NETWORK PARTICIPANTS" by Benjamin D. Baker filed Apr. 2, 2013, which is a continuation of U.S. patent application Ser. No. 13/018,344 (U.S. Pat. No. 8,417,729) for "SYSTEM AND METHOD FOR THE AUTOMATED NOTIFICATION OF COMPATIBILITY BETWEEN REAL-TIME NETWORK PARTICIPANTS" by Benjamin D. Baker filed Jan. 31, 2011, which is a continuation of U.S. patent application Ser. No. 12/021,374 (U.S. Pat. No. 7,885,977) for a SYSTEM AND METHOD FOR THE AUTOMATED NOTIFICATION OF COMPATIBILITY BETWEEN REAL-TIME NETWORK PARTICIPANTS," by Benjamin D. Baker, filed Jan. 29, 2008, which is a continuation of, and claims priority from, U.S. patent application Ser. No. 09/793,364, (U.S. Pat. No. 7,401,098) for a "SYSTEM AND METHOD FOR THE AUTOMATED NOTIFICATION OF COMPATIBILITY BETWEEN REAL-TIME NETWORK PARTICIPANTS," by Benjamin D. Baker, filed Feb. 26, 2001, and further claims priority from Provisional Application No. 60/185,858, filed Feb. 29, 2000 for an "INTELLIGENCE DRIVEN PAGING PROCESS USED IN AN INTERNET CHATROOM," by Benjamin D. Baker, all of which are hereby incorporated by reference in their entirety for their teachings, including all computer program listing appendices.

This invention relates generally to a network-based chat room system, and more particularly to an intelligent system and method for "paging" a chat room participant based upon information relating to that participant's characteristics.

COMPUTER PROGRAM LISTING APPENDIX

A computer program listing Appendix is hereby incorporated-by-reference. The Appendix includes 86 files concurrently filed herewith as follows:

| Name | Size | Created | |
|---|---|---|---|
| Application13_java | 1,028 | 05-09-00 | 3:32p |
| Application13_jav | 709 | 05-09-00 | 2:33p |
| Ben_html | 547 | 06-10-00 | 11:52a |
| browserusers_pkb | 6,143 | 06-26-00 | 10:25a |
| browserusers_pkh | 1,830 | 06-22-00 | 10:03a |
| browseusers_html | 760 | 06-10-00 | 7:16p |
| BrowseUsers_java | 8,973 | 06-16-00 | 7:50a |
| BrowseUsers_shtml | 0 | 06-10-00 | 7:23p |
| matchusers2_pkb | 764 | 05-27-00 | 9:46p |
| matchusers2_pkh | 304 | 05-27-00 | 10:15p |
| createpeople_pkb | 22,938 | 06-13-00 | 3:37p |
| createpeople_pkh | 135 | 06-10-00 | 7:27p |
| createtables_sql | 6,581 | 02-05-01 | 4:22p |
| Duplicates_sql | 1,541 | 05-29-00 | 8:03a |
| DUPTABLE_SQL | 95 | 02-02-01 | 3:49p |
| EasyChat_jpr | 1,982 | 06-14-00 | 4:10p |
| EasyChatApplet_html | 1,822 | 06-10-00 | 10:47a |
| EasyChatApplet_java | 15,561 | 06-13-00 | 7:56a |
| EasyChatServlet_jav | 11,688 | 06-13-00 | 7:55a |
| GETBIRTH_SQL | 448 | 07-10-00 | 8:21a |
| getchinese_sql | 453 | 07-10-00 | 8:11a |
| GETCOLOR_SQL | 442 | 07-13-00 | 9:13a |
| getmalfem_sql | 1,845 | 07-13-00 | 9:14a |
| GETMILES_SQL | 723 | 07-09-00 | 11:24a |
| GETMOON_SQL | 2,656 | 06-19-00 | 12:25p |
| getmoonsign_pkb | 940 | 02-06-01 | 12:33p |
| getmoonsign_pkh | 210 | 02-06-01 | 12:29p |
| getmoonsign_sql | 1,009 | 02-06-01 | 11:52a |
| GETPATH_SQL | 428 | 01-08-01 | 5:30p |
| getpoints_sql | 8,574 | 06-02-00 | 10:31a |
| getsigncode_pkb | 1,449 | 02-07-01 | 10:05a |
| getsigncode_pkh | 275 | 02-07-01 | 9:49a |
| getSUN_sql | 413 | 07-12-00 | 8:19a |
| getsunsign_pkb | 810 | 02-06-01 | 4:24p |
| getsunsign_pkh | 219 | 02-06-01 | 4:26p |
| getsunsign_sql | 783 | 02-06-01 | 10:07a |
| loadchina_sql | 1,840 | 06-19-00 | 7:11a |
| loadfname_ctl | 181 | 05-28-00 | 3:20p |
| loadfname_log | 1,549 | 05-28-00 | 3:22p |
| loadlname_ctl | 123 | 05-28-00 | 3:23p |
| loadlname_log | 1,466 | 05-28-00 | 3:23p |
| Loadlogic_txt | 276 | 07-09-00 | 2:08p |
| LOADSIGN_CTL | 687 | 05-22-00 | 11:09a |
| loadsign_ctl_doc | 5,120 | 05-14-00 | 1:17p |
| LOADSIGN_LOG | 4,020 | 05-15-00 | 7:05p |
| loadsigntables_pkb | 1,809 | 05-06-00 | 4:12p |
| loadsigntables_pkh | 189 | 05-06-00 | 4:12p |
| loadsigntables_sql | 142 | 05-06-00 | 11:00a |
| LOGIC_PRN | 1,451 | 07-09-00 | 2:08p |
| matchdaters_txt | 6,412 | 06-01-00 | 5:03p |
| MatchMachine_jws | 6,205 | 06-22-00 | 11:01a |
| MatchUsers_java | 5,423 | 07-10-00 | 8:26a |
| MatchUsers_jpr | 2,346 | 06-26-00 | 9:36a |
| matchusers_pkb | 9,763 | 02-06-01 | 3:49p |
| matchusers_pkh | 3,596 | 07-10-00 | 8:13a |
| MatchUsers_jav | 5,147 | 06-19-00 | 9:40a |
| NAMES_TXT | 2,414 | 05-28-00 | 4:51p |
| pathnumber_sql | 2,146 | 01-08-01 | 3:52p |
| pathnumbex_sql | 2,805 | 01-08-01 | 4:37p |
| Querries_jws | 2,469 | 05-25-00 | 2:06p |
| queryusers_html | 757 | 06-10-00 | 9:32a |
| QueryUsers_java | 3,567 | 06-10-00 | 9:40a |
| queryusers_htm | 757 | 05-25-00 | 3:28p |
| QueryUsers_jav | 3,565 | 05-28-00 | 11:31a |
| RajChat_html | 498 | 07-20-00 | 9:14a |
| RajChat_java | 15,978 | 07-20-00 | 10:17a |
| RajChat_jav | 14,704 | 07-19-00 | 8:55p |
| REGISTER_JPR | 2,086 | 05-15-00 | 12:31p |
| Registration_java | 3,621 | 05-15-00 | 11:46a |
| Servlet1_html | 760 | 05-17-00 | 12:12p |
| Servlet14_java | 2,279 | 05-10-00 | 3:18p |
| Servlet14_jav | 2,166 | 05-10-00 | 2:20p |
| SETPATH_SQL | 254 | 01-08-01 | 5:24p |
| SimpleQuery_java | 2,701 | 05-12-00 | 12:03p |
| SimpleQuery_jpr | 2,164 | 05-12-00 | 12:42p |
| simplesearch_html | 483 | 06-10-00 | 9:21a |
| SimpleSearch_java | 2,700 | 06-10-00 | 9:21a |
| SimpleSearch_jpr | 2,277 | 06-14-00 | 4:11p |
| SimpleSearch_shtml | 398 | 06-10-00 | 8:42a |
| simplesearch_htm | 481 | 06-10-00 | 9:02a |
| sqlldr_txt_txt | 149 | 05-22-00 | 4:15p |
| TESTDIS_PKB | 203 | 06-23-00 | 10:16a |
| TESTDIS_PKH | 1,681 | 06-23-00 | 11:06a |
| testrandom_sql | 1,646 | 05-25-00 | 6:12a |
| UPDZIP_SQL | 1,635 | 06-22-00 | 11:04a |

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND AND SUMMARY OF THE INVENTION

The present invention is related to computer Chat Room systems or similar network-based systems providing services to network users, specifically, the automated process of paging a chatter or other network participant. In one embodiment the paging may result in a display of information related to one or more chatters within a Chat Room system. In a related embodiment, the paging may be an audio, visual or similar sensory cue which may or may not be associated with a visual display related to the other chatter.

Heretofore, a number of patents and publications have disclosed computer-based Chat Room systems, the relevant portions of which may be briefly summarized as follows:

U.S. Pat. No. 5,764,916 to Busey et al. for a "METHOD AND APPARATUS FOR REAL TIME COMMUNICATION OVER A COMPUTER NETWORK," issued Jun. 9, 1998 is an exemplary representation of a Chat Room.

U.S. Pat. No. 5,828,839 to Moncreiff for a "COMPUTER NETWORK CHAT ROOM BASED ON CHANNEL BROADCASTS IN REAL TIME," issued in Oct. 27, 1998 is directed to one or more Chat Rooms with the conversation being related to TV/Radio broadcasts of the chatters' preferences. The spirits of these inventions best capture the essence of the present-day Chat Room system; people conversing via a computer network designed to accommodate chatters with themed Chat Rooms for the purpose of initiating a common conversation. Traditionally, those chatting have had to type the conversation, however, Voice and Video communication technology is being introduced through Internet Portals using data compression methods similar to those described in U.S. Pat. No. 5,838,927 to Gillon et al., issued Nov. 17, 1998 for a "METHOD AND APPARATUS FOR COMPRESSING A CONTINUOUS, INDISTINCT DATA STREAM."

WO 98/16045 to Goldfinger et al., PCT Publication of 16 Apr. 1998 for a "COMMUNICATIONS SYSTEM," hereby incorporated by reference for its teachings, is directed to a communication network wherein users of the network can list "sought" users and the sought users are identified to the "seeking" user whenever they are "on-line." The list of sought users must, however, have been predefined by the seeking user. The publication further describes in detail, aspects of such a system, wherein the user's are tracked or identified by an identifier or identification code, and the identifier is associated with the user's network address of the user's communication terminal.

Furthermore, various well-known Internet Portals (IPs) such as Yahoo.com, Excite.com, AOL.com have Chat Rooms systems with functionality beyond simple conversation (communication via typing on a keyboard or via voice chat). For example, these Internet portals employ Chat Rooms systems that provide additional functionality such as:

1. Search Engine—Many Chat Room systems provide search engines that enable a user to search for other chatters by inputting previously known chat name(s) and being presented with a list of where the desired chatter(s) are "chatting." The user normally has previously encountered and conversed with the other chatter(s) and is simply looking for a chatters' chat name within the search engine archives to see if that person is currently logged into the Chat Room system. This information is valuable to a user, because it shows whether the other chatter(s) is available to chat in real-time. Usually, this functionality accompanies a display, providing a link that takes the user from the search engine interface screen directly to a Chat Room in the system. This is a completely proactive approach of finding friends.
2. Paging System—Several chat systems allow a chatter to keep a list of "friends" within the Chat Room system memory. When a chatter is logged into the Chat Room system, the Chat Room software will prompt or page the user upon detecting that one or more friends are logged in the chat system. A display of the chat name within the user's current Chat Room will appear notifying the user that the friend is logged into the system.
3. Profile—Many chat Room systems use a database to provide or display a list of characteristics of one chatter to another chatter. The characteristics, (the data) are provided to the Chat Room system by the chatters themselves. Commonly, chatters are given a set of questions to answer when first registering or logging into a Chat Room system. The answers to these questions are intended for display to other chatters. Criteria such as personal interests, hobbies, geographic location, age group, astrological information and sexual preferences are stored in a database and may subsequently be compiled into a list, which is revealed graphically, to other chatters in a visual display window should the other chatters choose to look at such a profile. The profile is commonly accessed by chatters using a computer mouse that enables the chatter to click a button and bring up another chatter's profile, where the button typically launches a new and separate display to the chatter revealing the profile.
4. Navigation within a Chat Room System—A chatter attends and moves to new Chat Rooms by clicking on a link that conveys to the computer Chat Room software (such as IRCD "Internet Relay Chat Daemon") that the chatter wishes to move to the Room that Corresponds to the link. Within the Chat Room system, there are a multiple of rooms. Each room has a theme or topic for discussion. For example, there are rooms that have a politics theme. A chatter would click the appropriate link for the politics room in order to chat with others about politics.

Most Chat Room systems have functionality that allows a maximum number of chatters to chat in one room. For instance, the functionality may only allow up to twenty-five chatters to chat in one room at a time. This is a necessary limitation, as too much activity in a room may hinder the ability to comprehend or create fluidity in a conversation. Hypothetically, the theme of this room could be Politics. With this model, the Chat Room system software will automatically create a new room of the same theme (Politics) once the room reaches its limitation of 25 chatters within a room. This new room will accommodate any new chatters who wish to be in the Politics Room.

Perhaps more important is the fact that when a new chatroom is created, a user who enters later may not know that other chatters he/she is accustomed to seeing are already participating in a filled chat room. The current invention eliminates such problems by showing (or paging) a user with characteristics of another person who may be in the same chat system, but in another room.

For example, if there were 300,000 chatters that Yahoo has at any one time in the same room, there wouldn't be a need for paging, because one could see all of the characteristics that are shown in the room (Assuming that one has a visual display devise that will show all 300,000 chatters' names at once.) The limitation of the number of users in any particular chat room emphasize the advantages of a profile display or paging system as described herein.

Ultimately, the Chat Room systems are very similar. There are multiple rooms; each room has a theme, or topic to induce a common conversation. Each chatter has a fictitious name and a means of finding other chatters via a search engine. And lastly, they have a paging system that will display information to a chatter if a friend(s) should log into the Chat System during the time that the chatter is logged into the system himself. These Chat Room systems' style of communication is effective for initiating or guiding a common conversation. They are designed to unite chatters with the intent of creating conversation subject matter through themed rooms, such as politics, for the sake of a common conversation. It will be appreciated that the paging of "friends," as provided by one aspect of the present invention, may not be important for inducing a conversation based on a themed room. However, the purpose of identifying the common paging process is that the pager in any other chat room is completely pro-active. Thus, a "friends" paging system only pages those who already know each other and functions only when the user enables or programs it to do so.

The aforementioned Chat Room functionality does not provide a way of introducing, prompting or paging unknown or non-"friends" chatters based upon either personality traits (including, for example, astrological sign) and/or geographic location. This functionality, however, is crucial for establishing lasting interpersonal relationships that extend beyond a Chat Room experience. Unfortunately, well-known Chat Room systems are not designed to unite chatters for the sake of creating new and meaningful interpersonal relationship with another chatter.

It is common knowledge, in the psychiatric community, that interpersonal relationships are most successful when the people involved have much in common. Examples of commonality include chatters having similar interests, such as a leisure time activity, or commonality of the area in which they live. Living within the same area or city accommodates a more likely chance that chatters will establish more involved relationships outside of the Chat Room system. However, there is no paging (or introduction) system that will alert a user should another unknown chatter, have favorable commonalities such as geographic area and common psychological traits; thereby matching people from all over the world that are logged into the Chat Room system.

Knowledge of being able to share in these common leisure time activities, with other chatters, and having commonalities in psychological traits assures the chatters of a greater chance of successful relationship. On this point, existing Chat Room systems are believed to be inferior because they are unable to alert, page, or otherwise notify a user that there is another chatter(s) that meets favorable requirements for a successful interpersonal relationship.

The present invention is, therefore, directed to a new system designed to unite chatters for the purpose of creating new interpersonal relationships. The system is referred to as an Intelligence Driven Paging Process (IDPP). The IDPP is a process that augments and adds functionality to the profile functionality of known Chat Room systems and provides a means for promoting or prompting communications between two or more individuals. The current and common profiling system only displays profile information to a user upon request, usually by clicking a link. Because the profile display process of conventional Chat Room systems is only initiated when a user requests the information, it can be seen as reactive. Once the buttoned is clicked, the Chat Room system launches a separate and new display for review, where the display depicts the profile information of only one chatter.

Conversely, one aspect of the IDPP is different in that it is proactive and automated; instead of waiting for a chatter to click a button to review a profile, the IDPP uses predetermined preferences to ascertain personal compatibility between chatters based upon profile information for each chatter logged into the Chat Room system. If the IDPP system determines that these preferences are favorable for interpersonal compatibility, the system will automatically notify or page the chatters to be introduced.

It will be further appreciated that a user may control the desirable profile characteristics that will be used to select chatters for display to the user. It will also be appreciated that the simple process of displaying a table, or similar visual representation, of chatter profile information in association with an ongoing chat session may prove, in and of itself, a valuable feature.

This novel paging process is further intended to solve the problem of overcrowded Chat Room systems. For example, large Internet Portals such as America Online and Yahoo may have hundreds or thousands of chatters within the system at any given time. It is impossible for a user to view every profile of the other chatters (via a link to a profile display) who were logged into the Chat Room system at that given time; people log in and out of the system randomly. Another aspect of the IDPP solves this problem due to its proactive, intelligence-driven paging process. More specifically, the IDPP may be employed to notify a user of other chatters' characteristics without having to click on links to find other chatters' profile information. The IDPP uses the profile information and preset compatibility preferences of all chatters that are logged into the Chat Room system in order to determine interpersonal compatibility. If the IDPP's system logic determines that two or more people are compatible (using Compatibility Criteria), the profile information may be automatically displayed. This saves chatters time by not requiring them to click on the profiles of every chatter within the system to determine the compatibility of said chatters.

The Compatibility Criteria used by the IDPP can be identified and determined by well-established psychological methods. The methods used may also be based upon identified commonality between chatters' personality traits and geographic location. Commonality includes that of psychological personality traits; such as the way chatters interact emotionally or the way chatters cognitively function. Any given information will suffice, however.

As will be appreciated by those knowledgeable in the area of psychiatry, there are myriad of methods to identify cognitive and emotional personality traits in order to create data for a Chat Room system to determine which chatters should be introduced to other chatters. These traits or data can be identified and saved into the Chat Room system memory. The data that is saved into the system memory can be used to compare such data to the archived data of all other chatters within the Chat Room system.

For example, the IDPP may use the results of standard industry personality typing tests such as the Myers, Briggs Personality Assessment Test or the Keirsey, Bates Temperament Sorter, another personality typing system, as used in Please Understand Me, Character and Temperament Types, published in 1978 by David Keirsey and Marilyn Bates.

Additionally, Astrology, a controversial science spanning thousands of years, can be used to identify and describe such traits. These are only two examples of ways to determine and identify data of a chatter needed to compare with data of other chatters. Data required for comparison may be as simple as marital status (e.g., single and divorced chatters being identified as compatible), need for employment, religious preferences, or age.

As used herein, the processes are examples of ways that are intended to identify facets of a chatter's personality. It does not matter which system is used for identifying these facets, as the IDPP system will compare any and all data contained in chatters' profiles in order to page and Introduce two or more of said chatters.

In accordance with the present invention, there is provided a method for the automated display of human participant-specific data to a human participant of a network chat room, comprising the steps of: (a) collecting human participant customized data for a plurality of chat room participants; (b) storing, in memory, the human participant customized data collected, (c) sorting said human participant customized data from a plurality of chat room participants by participant-specified preferences; and (d) automatically displaying sorted human participant customized data to at least one participant in association with a network chat room.

In accordance with another aspect of the present invention, there is provided a method for determining the compatibility of at least two participants in a chat room, and for the automated paging of compatible participants, comprising the steps of: (a) collecting human participant customized data for a plurality of chat room participants; (b) storing, in memory, the human participant customized data collected; (c) sorting said human participant customized data from a plurality of chat room participants by participant-specified preferences; (d) automatically computing the compatibility of at least two human participants, and (e) paging the participants to indicate their compatibility.

In accordance with yet another aspect of the present invention, there is provided a method for automatically prompting compatible users in a network based upon a compatibility criteria, comprising the steps of: (a) collecting human participant customized data for a plurality of network users; (b) storing, in memory, the human participant customized data collected; (c) sorting said human participant customized data from a plurality of network users by participant-specified preferences; (d) automatically computing the compatibility of at least two network users using the predetermined criteria; and (e) paging the network users to indicate their compatibility.

In accordance with a further aspect of the present invention, there is provided a system for the automated display of human participant-specific data to a human participant of a network chat room, comprising: a computer network for collecting human participant customized data for a plurality of chat room participants; a database for storing, in a memory, the human participant customized data collected via the network; and a processor, associated with said network and with access to said database, for sorting said human participant customized data from a plurality of chat room participants using compatibility criteria, and automatically displaying at least a portion of the sorted human participant customized data to at least one participant in association with the network chat room.

The techniques described herein are advantageous because they significantly improve the functionality of traditional chat rooms, with little additional overhead. Moreover, the techniques provide to chat rooms, the opportunity to easily identify compatible chatters, avoiding the tedious process of manually reviewing chatters' profiles. As a result of the invention, it is believed that chat room and network participant satisfaction will increase as will the usage of chat rooms and networks that employ aspects of the present invention.

Figure 1:
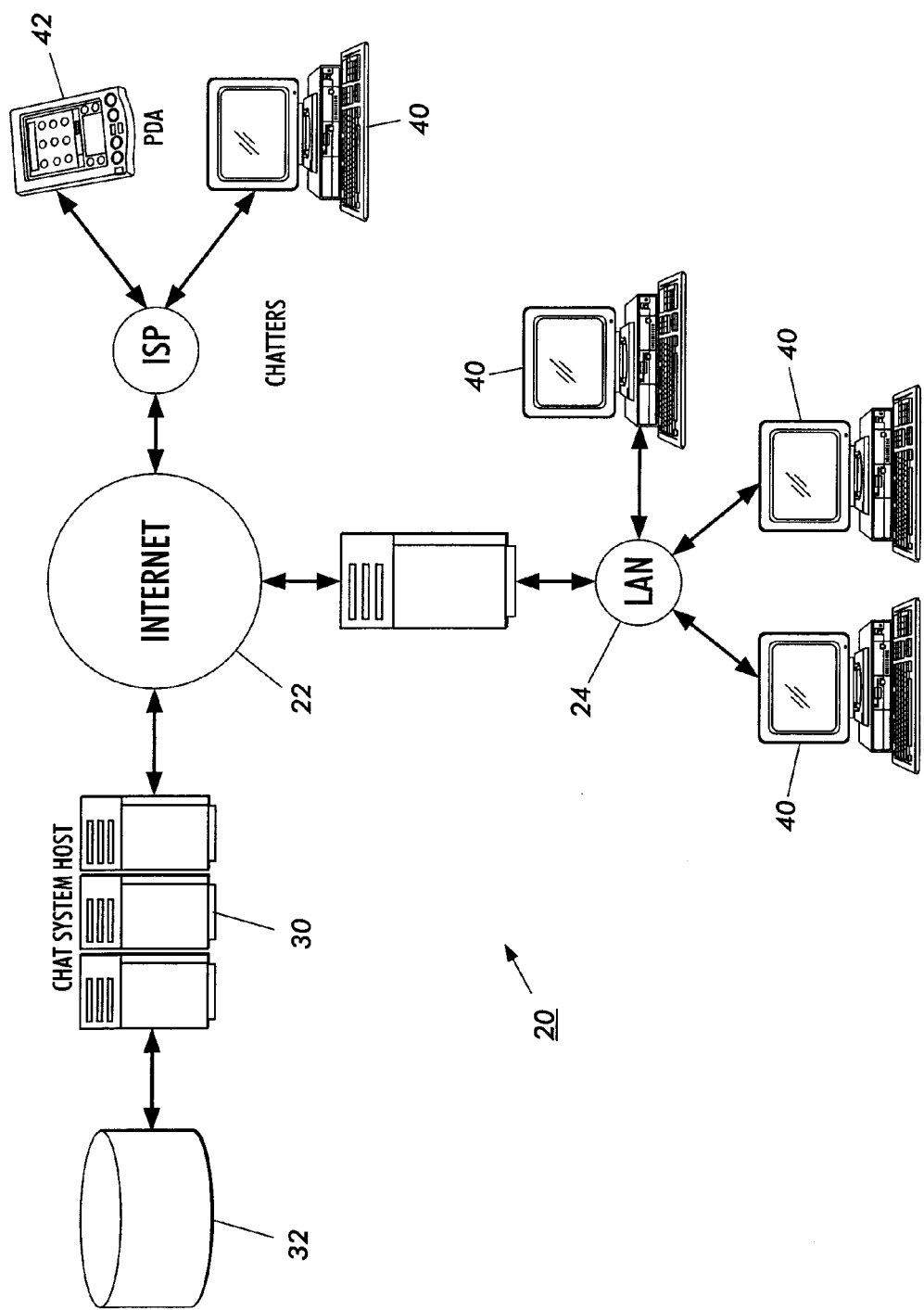
FIG. 1 is an overview of a network system in which the present invention finds particular application.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements. In describing the present invention, the following term(s) have been used in the description.

A "Chat Room system" is one or more networked computers implementing a Chat Room or multiple of chat rooms, and including various functions implemented therein such as search engines, memory archives containing chatters' profile information, voice and video transmission capability. Such system is at least, but not limited to the traditional chat room as described in U.S. Pat. No. 5,764,916 to Busey and Weghort (1996) and U.S. Pat. No. 5,838,927 to Gillon and McFadden (1996), and the network is understood to be a wired or wireless communication network.

A "chatter" or a "user" is a person participating or communicating within a computer Chat Room system, whether the person is actively or passively communicating.

"Voice chat" is chat communication via computer microphone and speakers using a computerized communication system as the medium. It is typically an added function in well-known Chat Room systems. As used herein, a "user" is the chatter who initiates an action or is the original chatter referred to in an explanation involving multiple chatters.

A "chat name" is generally a fictitious name chosen by a chatter to be used as guise in a Chat Room system.

A "link" is an Internet Address connector or a pointer, typically in an HTML document, that leads to another World Wide Web site, or to another place within the same document; also called a hyperlink. A link is activated by clicking on it or otherwise indicating a selection by a user.

"Friend" is a person who has created a relationship with another person (chatter or other network user). Usually, Chat Room systems allow a chatter to save another chatter's chat name in the Chat Room system memory. Once a chat name is saved into the Chat Room system memory, the system will display, to the user, whether or not the friend(s) are logged into the Chat Room system.

"Introduce" means the action of paging a user and displaying a link for certain chatter or chatters that will move these certain chatters into a common Chat Room or enabling them to chat in a common medium within the same Chat Room system. Introduce could also mean the display of characteristics to the parties involved, without communication actually being established, where the system could provide them a choice or prompt to engage.

Referring to FIG. 1, there is depicted an exemplary embodiment for the present invention. In particular, the Chat Room system 20 enables a plurality of users or chatters to access the system via the Internet 22 or other wide-area network, or via local area network (LAN) connections 24. Connected, via wired or wireless connections (e.g., cellular and digital telephones), the chatters interact with the chat host system 30 through web interface software (not shown) such as a web browser or other chat enabling software. Operation of the chat room is controlled by Chat Room system software that is preferably stored in the memory of system disk drive 32. Also stored on drive 32 is at least one database containing information pertaining to the profiles of chatters, information about the various chat rooms and the "threads" of conversations occurring therein. Once the chat system is operational, users or chatters located at computer workstations 40 (having video displays, processors, keyboards, etc.) or wireless devices such as cellular phones or personal digital assistant (PDA) devices 42 may "connect" to a chat room and begin or participate in a conversation.

As is well-known, users of such chat rooms may also access profile information for other chatters by simply clicking a mouse or cursor-based pointing device on the chatters name. For example at chat rooms on http://chat.yahoo.com, clicking on a chatters chat name will produce a window or dialog box that allows the user to see the chatter's profile, send a personal message to the chatter, etc. Similarly, one or more chatters may be added to a user's "friends" list (associated with the user's information in the database stored on disk 32). A user may then check to see if friends are currently on-line or chatting in a particular room. Similarly, the system might notify the user when a friend has logged on to participate in the chat. Such a system is taught, as noted above by WO 98/16045 to Goldfinger et al., PCT Publication of 16 Apr. 1998 for a "COMMUNICATIONS SYSTEM," and is hereby incorporated by reference for its teachings related to the implementation of such a system. The list of sought users of friends must, however, be predefined by the seeking user.

Figure 2:
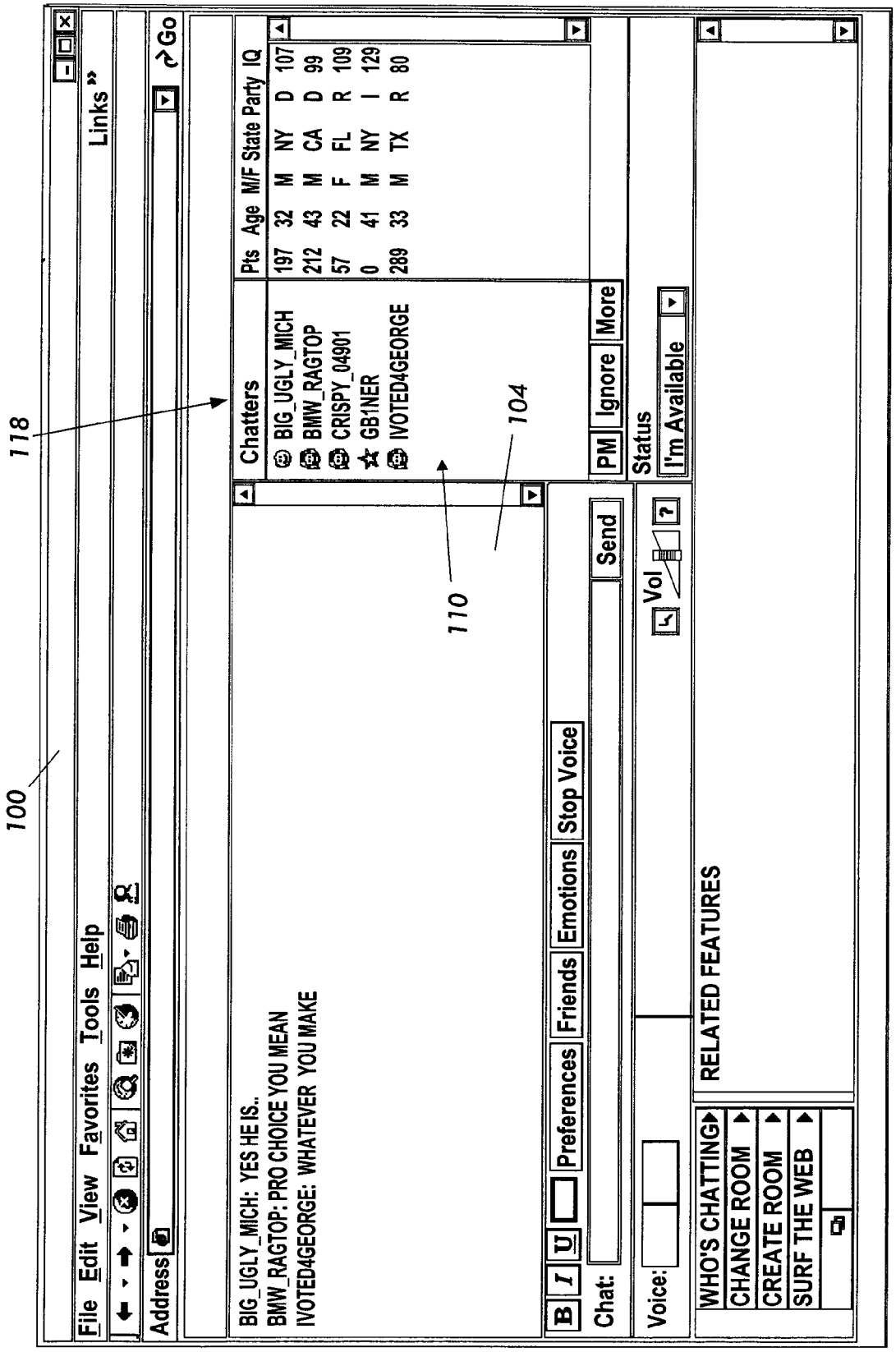
FIGS. 2-3 are illustrative examples of user-interfaces in accordance with aspects of the present invention.

Turning next to FIG. 2, depicted therein is a user-interface screen that will serve as an exemplary illustration of various aspects of the present invention. In particular, the figure depicts exemplary chat interface screen 100 of a well-known chat interface such as http://chat.yahoo.com, modified to include features in accordance with the intelligence driven paging process (IDPP) of the present invention. IDPP is a proactive and automated process for identifying "compatible" chatters; instead of waiting for a user to make a selection to request a profile of another chatter, the IDPP uses predetermined preferences to ascertain personal compatibility between chatters based upon profile information for each chatter logged into the Chat Room system.

For example, to the right of chat window 104, the other chatters in a room are listed in a table or window region 110. Table 110 includes a left-most column 118 that shows the chatters name, and one or more columns to the right thereof that depict personal profile information that each chatter has entered about themselves. For example, in the Politics chat room of FIG. 2, the chatter profile information might include age, gender, residence state, political party and intelligence quotient, as depicted by the five columns along the right side of table 110. The remaining column in table 110 is an optional "points" column that provides a score for the compatibility between the chatter and the user, as will be described in further detail below. Furthermore, when the IDPP system determines that the compatibility score is favorable for interpersonal compatibility, the system may automatically notify or page the chatters to be introduced. Details of the comparison and compatibility processing are found in the various matchusers.* files in the Appendix. As will be appreciated, a chatter may or may not have the ability to pre-approve his/her participation or use of the IDPP matching, depending upon the system implemented.

Figure 3:
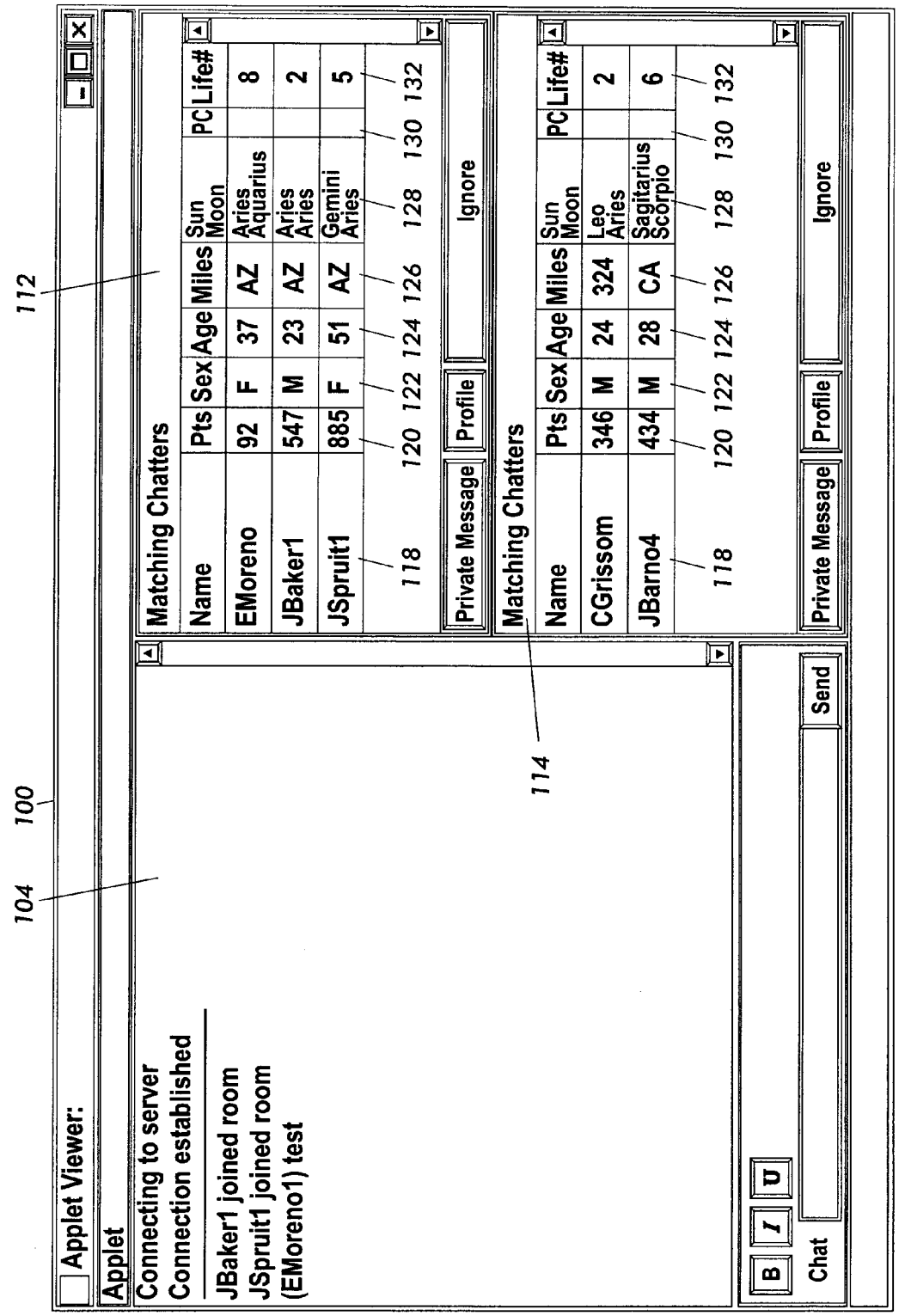

Turning next to FIG. 3, there is shown another embodiment that will further illustrate aspects of the present invention. In particular, the figure depicts an exemplary chat interface screen 100 produced by an application program such as an applet as detailed in the computer programs listed in the Appendix, preferably running in association with a browser. The screen includes a chat window 104, a window 112 listing all chatters in the room, and a window 114 listing all "matching" chatters logged in to the system. As implemented in the embodiment of FIG. 3, IDPP is a proactive and automated process for identifying "compatible" chatters as previously described.

In windows 112 and 114, the listings for each of the other chatters is reflected in a table format, where the table includes:
- at column 1, the other chatter's chat name (118);
- at column 2, the other chatter's point score (120);
- at column 3, the other chatter's gender (122);
- at column 4, the other chatter's age (124);
- at column 5, an indication of the distance between the chatter and the other chatter (in miles or by state, etc.) (126);
- at column 6, the other chatter's astrology profile (128);
- at column 7, the other chatter's personality color (130); and
- at column 8, the other chatter's Life# indicating the numerology life path number of the chatter, based on birth date information and theories of Numerology provided by Pythagoras (Greece 600BC) (132).

For example, in the chat room of FIG. 3, the IDPP system might indicate that the two chatters in window 114 are compatible, thereby indicating their names and data in the window. As a result of the compatibility comparison, the IDPP system determines that the compatibility score is favorable for interpersonal compatibility, and automatically prompts or pages the current users by placing their names in window 114. It will be further appreciated that window 114 may be updated automatically, or manually in response to a user selection, in order to display still further chatters that are determined by the IDPP system to be compatible.

This novel prompting or paging process is further intended to solve the problem of overcrowded Chat Room systems. For example, large Internet Portals such as America Online and Yahoo may have hundreds or thousands of chatters within the system at any given time. It is impossible for a user to view every profile of the other chatters (via a link to a profile display) who were logged into the Chat Room system at that given time; people log in and out of the system randomly. More specifically, the IDPP may be employed to notify a user of other chatters' characteristics without having to click on links to find other chatters' profile information. If the IDPP's system logic determines that two or more people are compatible (using Compatibility Criteria), the profile information for the compatible chatter(s) may be automatically displayed. This saves chatters time by not requiring them to click on the profiles of every chatter within the system to determine the compatibility of said chatters.

The Compatibility Criteria used by the IDPP can be identified and determined by well-established psychological methods. The methods used may also be based upon identified commonality between chatters' personality traits and geographic location. Commonality includes that of psychological personality traits; such as the way chatters interact emotionally or the way chatters cognitively function. Any given information will suffice, however.

For example, compatibility may be determined from the answers that the user gave on a test (online or not) that determines a psychological profile such as the Myers Briggs Personality Test or the Keirsey Temperament Sorter. Such answers may show tendencies to voice emotions more or less than another person. As a further example, consider the personality traits of a first born child, which may provide compatibility for a youngest child in the sibling birth order because the first born since early childhood has grown in a "role" that provides certain emotional stabilities that the youngest child is used to receiving.

Another example would be where, as a result of data derived from a test, a person is labeled as one who tends to voice her emotions whenever they arise. She essentially wears her heart on her sleeve. Because of this trait, she should be matched with another person that has traits that allow him the patience to invariably listen to her at the pace in which she voices her emotions. They would be compatible because the combination of their personalities allows for a greater amount of self-expression than many other personality combinations would allow.

Although alternative methods and systems may be employed to implement the IDPP system, one embodiment includes improved chat host system software that is modified so as to continuously or periodically run one or more programs to (a) identify chatters and retrieve profile and compatibility metrics from a database, and (b) run a program to "calculate" the compatibility of at least one chatter with another chatter and return a score representing the compatibility. It will be appreciated that in a preferred embodiment, the compatibility calculations will be run for a plurality of chatters, preferably including all chatters that have opted to participate in the IDPP system.

In a particular alternative embodiment, one or more of the pieces of user profile data could be "set" or "selected" by a chatter as attributes that he/she might want to search for or use as an alternative to, or in association with, the compatibility criteria so as to further limit the chatters identified as compatible. In other words, using an example from FIG. 3, described above, the user could limit the display of compatible chatters to those who are male and over 25 years old (thereby only showing the JBarno4 entry in row 2 of window 114 and eliminating the row for CGrissom in the figure). Accordingly, this alternative embodiment is believed to add value to a system implementing IDPP as it allows a chatter to search for particular characteristics he/she may want.

As will be appreciated by those knowledgeable in the area of psychiatry, there are myriad of methods to identify cognitive and emotional personality traits in order to create data for a Chat Room system to determine which chatters should be introduced to other chatters. These traits or data can be identified and saved into the Chat Room system memory. The data that is saved into the system memory can be used to compare such data to the archived data of all other chatters within the Chat Room system.

For example, the IDPP may use the results of standard industry personality typing tests such as the Myers, Briggs Personality Assessment Test or the Keirsey, Bates Temperament Sorter, another personality typing system, as used in "Please Understand Me, Character and Temperament Types," published in 1978 & 1984 by David Keirsey and Marilyn Bates, particularly pages 4-13, the relevant portions of which are hereby incorporated by reference. Additionally, Astrology, a controversial science spanning thousands of years, can be used to identify and describe such traits. In the examples presented to this point, the threshold for compatibility has been a "match" (e.g., equals or opposites). However, it will also be appreciated that in various rankings, or combinations of compatibility criteria, a score or point system may be used, where compatibility is determined based upon the difference in points or score being within a predefined threshold. These are only two examples of ways to determine and identify data of a chatter needed to compare with data of other chatters. Data required for comparison may be as simple as marital status (e.g., single and divorced chatters being identified as compatible), religious preferences, or age.

Figure 4:
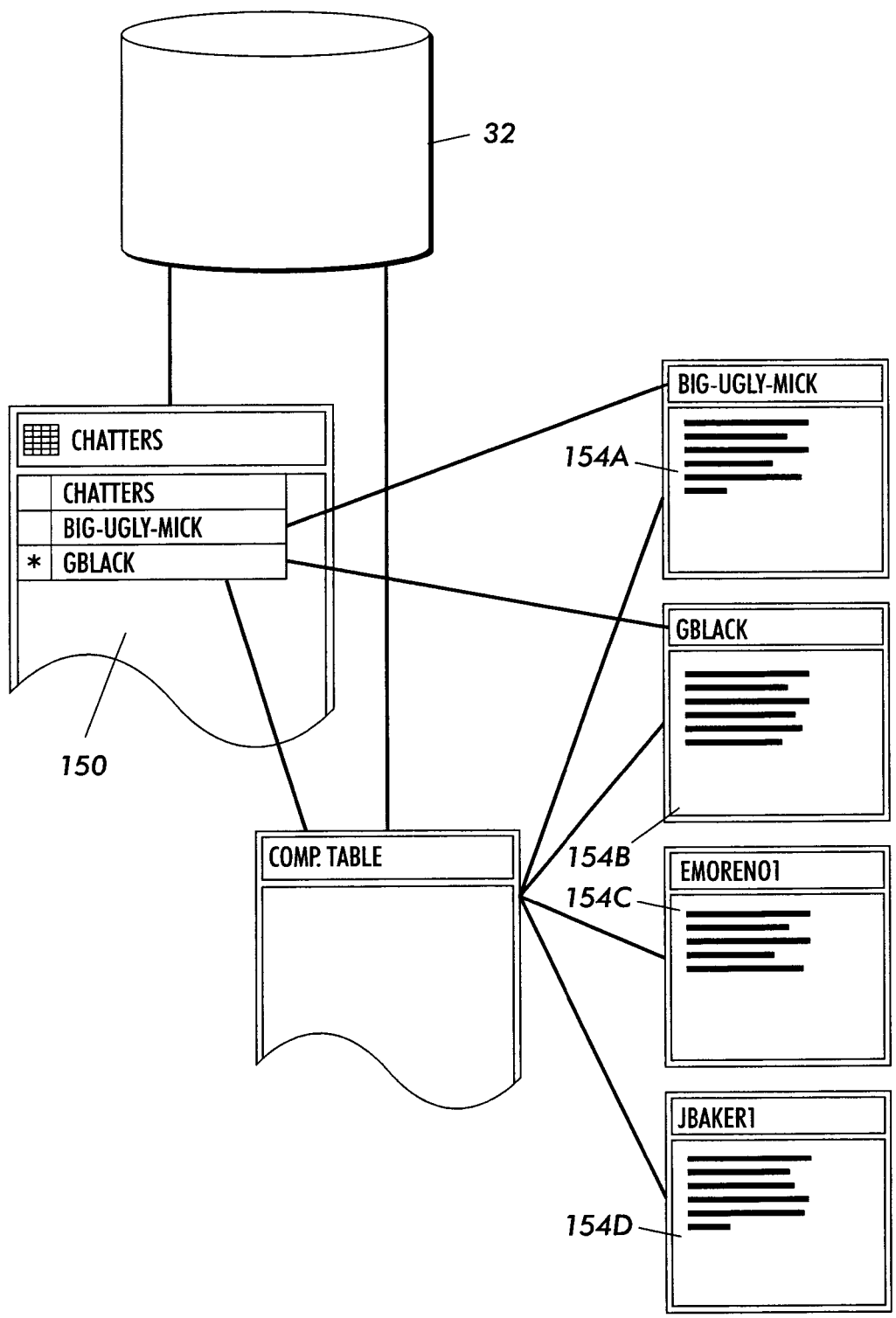
FIG. 4 is a schematic illustration of an exemplary database structure for an aspect of the invention of FIGS. 2-3.

As used herein, the processes are examples of ways that are intended to identify facets of a chatter's personality. It does not matter which system is used for identifying these facets, as the IDPP system may compare some or all data contained in chatters' profiles in order to page and introduce two or more of said chatters. For example, as depicted in FIG. 4, the personality information associated with a plurality of chatters defined in the chatter list 150 on disk 32, contains pointers to records 154 (a, b, etc.) that contain a chatter's profile information as well as his/her personality or compatibility information. For example, within records 154, there may be fields such as gender, age, location, astrological sign, personal color, political party, marital status, sexual preference, on-line time, chat time, etc., as depicted for example in FIG. 4.

Software or firmware that may be used to direct and store data within the database files on server host 30 (e.g., disk 32) may include database software such as Microsoft SQL (database software) and Microsoft Visual Basic (programming software). Other programs may be used to direct and store such personal data as described above. These other programs may be Oracle database software and C++, Java Applets, and similar software to direct the data to its intended locale. The protocol for the networked computers to communicate with each other may be the industry standard IP (Internet Protocol). The networked computers may also use TCP/IP, another industry standard for network communications. Lastly, a chat room software such as iChat™ or IRCD (an industry standard) may be required to create a chat room in which human participants interact, and to which the various improvements and enhancements may be added.

Ultimately, the various components required to implement at least one embodiment of the present invention include:

1. Computer (or server) that is connected to at least one other computer via IP, TCP/IP or another computer network protocol.
2. A software database such as SQL or Oracle that is capable of storing said human specific data.
3. Programming software that can work in conjunction with the software database that is used to direct data for display to human participants within the chat room network.
4. Chat room software that enables human participants to communicate in real-time via the network protocol such as iChat™ or IRCD.

With respect to the collection of human participant defined, human specific data may, various means may be employed to accomplish the data collection, including but not limited to:

Human participant entry of data directly into the database via computer keyboard and a network interface (e.g., web-page or specific knowledge that the participant may have acquired), and Human specific data imported from, or exchanged with, preexisting database records, such as physical address, e-mail address, and ethnicity as a matter of public record, which may be input into the database.

In yet another embodiment, the present invention contemplates the use of e-mail to notify a chatter of other compatible chatters. As described above, the IDPP system is directed to an invitation to communicate between real-time chatters. The IDPP pages or otherwise notifies users of compatible chatters (based upon profile information) within a chat room. This alternative embodiment further extends that function with e-mail. Ultimately, users of a chat room system may be paged, notifying a user that another person that he/she should be introduced to is either in the chat room, or is on-line and available to go to the chat room in order to converse.

There are believed to be at least two scenarios where this process would work:

Scenario 1. chatter #1 is in the chat room system and he provides to the chat room server information that he plans to be logged into the chat room for a certain period of time. If there are other prior users of the chat room that should be notified that chatter #1 is available to chat (based upon their compatibility and indicated preference to be notified), but are not logged into the chat room system, then those chatters may be sent an e-mail stating that chatter #1 is logged into the system and that he will be there for the given period of time (chat time).

Figure 5:
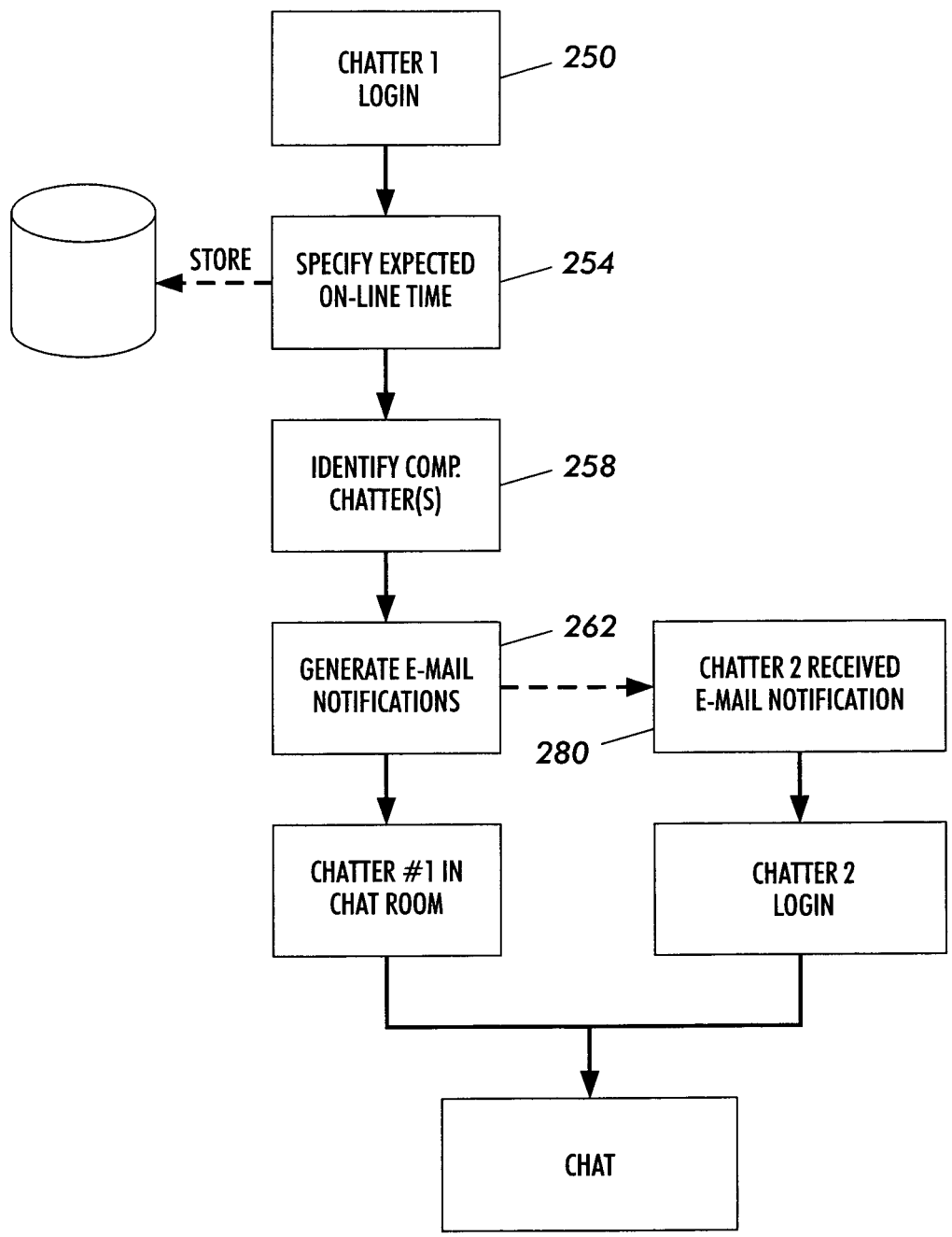
FIGS. 5 and 6 are flow charts depicting the steps associated with alternative embodiments of the present invention.

For example, as depicted in FIG. 5, after chatter #1 enters the chat room (step 250), he indicates, in response to a system prompt, that he will be in the chat system for one hour (step 254). If the IDPP would normally match him with chatter#2 using the compatibility identification process (step 258), then if chatter #2 is not in the chat room or logged onto the chat system, she receives an e-mail generated by the chat system (step 262). Upon receipt of the e-mail (step 280), chatter #2 is notified that chatter #1 is available to chat for the specified time if she wishes to engage. The e-mail will contain profile information of chatter #1 for her to make a decision. It is believed that such an embodiment will eliminate the problem of people missing a conversation that should be had (something that the user wants—meeting people he wants to meet) when all parties are not logged into the chat room system.

Figure 6:
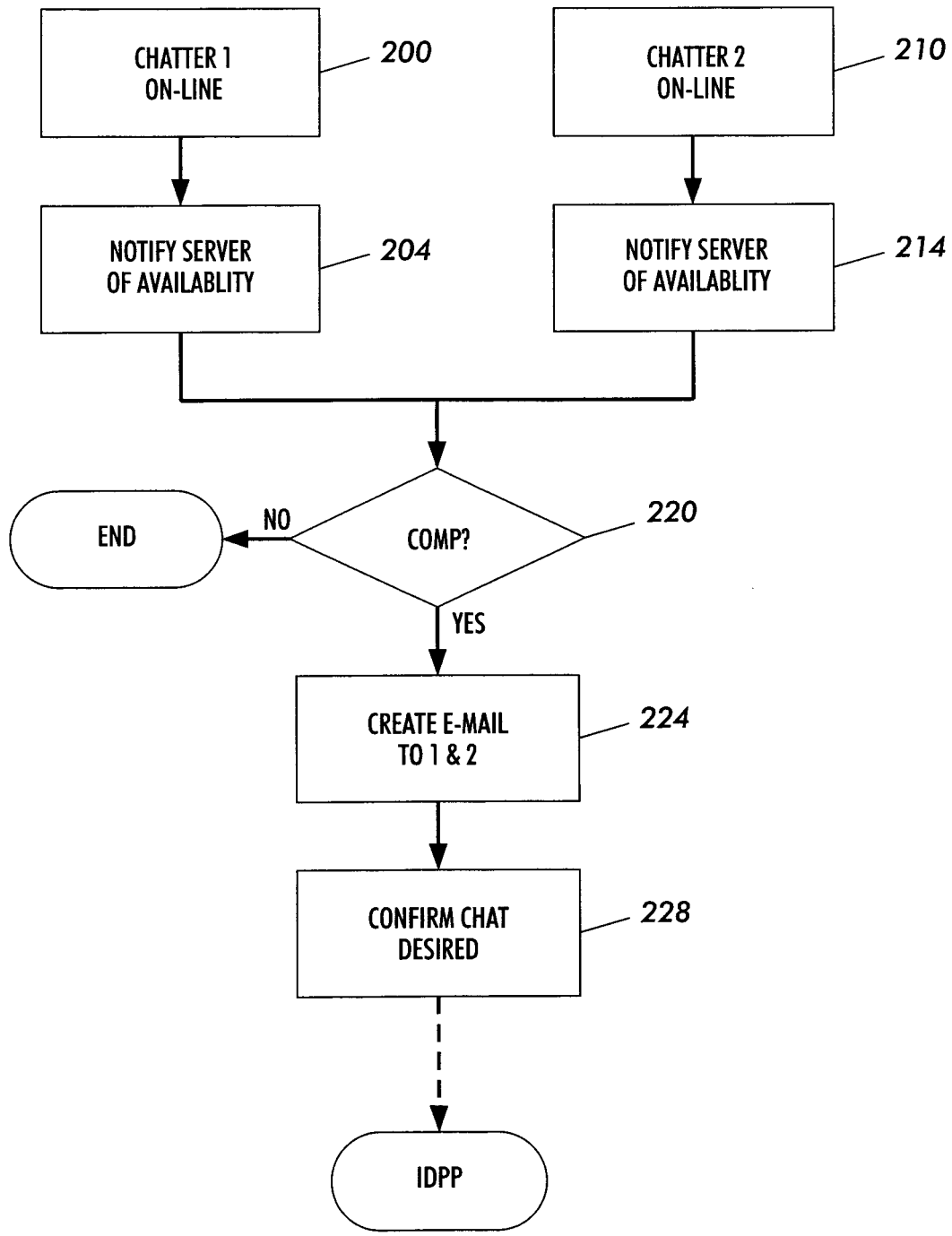

Scenario 2. In this scenario, depicted in FIG. 6, chatter #1 is on-line but is not logged into the chat room system (step 200), but goes to the chat website and tells the chat room server that he will be online (online is equivalent to being in front of his computer, on the Internet, just not logged into the chat server) for a certain period of time (step 204) after which he can leave the site. Similarly, chatter #2 is on-line (step 210) and tells the chat room server that she will be online for a certain period of time (step 214) before leaving the site. At step 220, the compatibility of the chatters is compared, including criteria for coinciding on-line time periods (on-line times). If compatible, then the chat room system e-mails them both each other's profile info (step 224) and allows them to make an auto-response selection showing whether or not they wish to chat with the other person, and at what time they will log into the system (whether it's immediately or 5, 10, 15 minutes etc.) If they both confirm that they want to chat, then the system may also e-mail them both a confirmation with the time that they both agree to meet in the system. Here again, once the chatters log into the chat room system the normal functionality of the IDPP continues.

In a further alternative embodiment, chatters that should be introduced based upon compatibility determined according to the IDPP system described above may be alerted to this fact via an e-mail generated by the chat room system. More specifically, the chat room will allow the chatter to indicate one or more local establishments where the chatter will be on a particular day or at a particular time (e.g., nightclub, restaurant, bar, coffee house, grocery store, etc.). In particular, there will be a place for chatters to indicate which establishments they will go to in their city on a particular evening. If the two should meet (due to the natural functionality of the IDPP indicating compatibility and a common establishment/time), the IDPP will e-mail both chatters (either a digital page to their phone or regular e-mail) letting them know that the other will be there.

Figure 7:
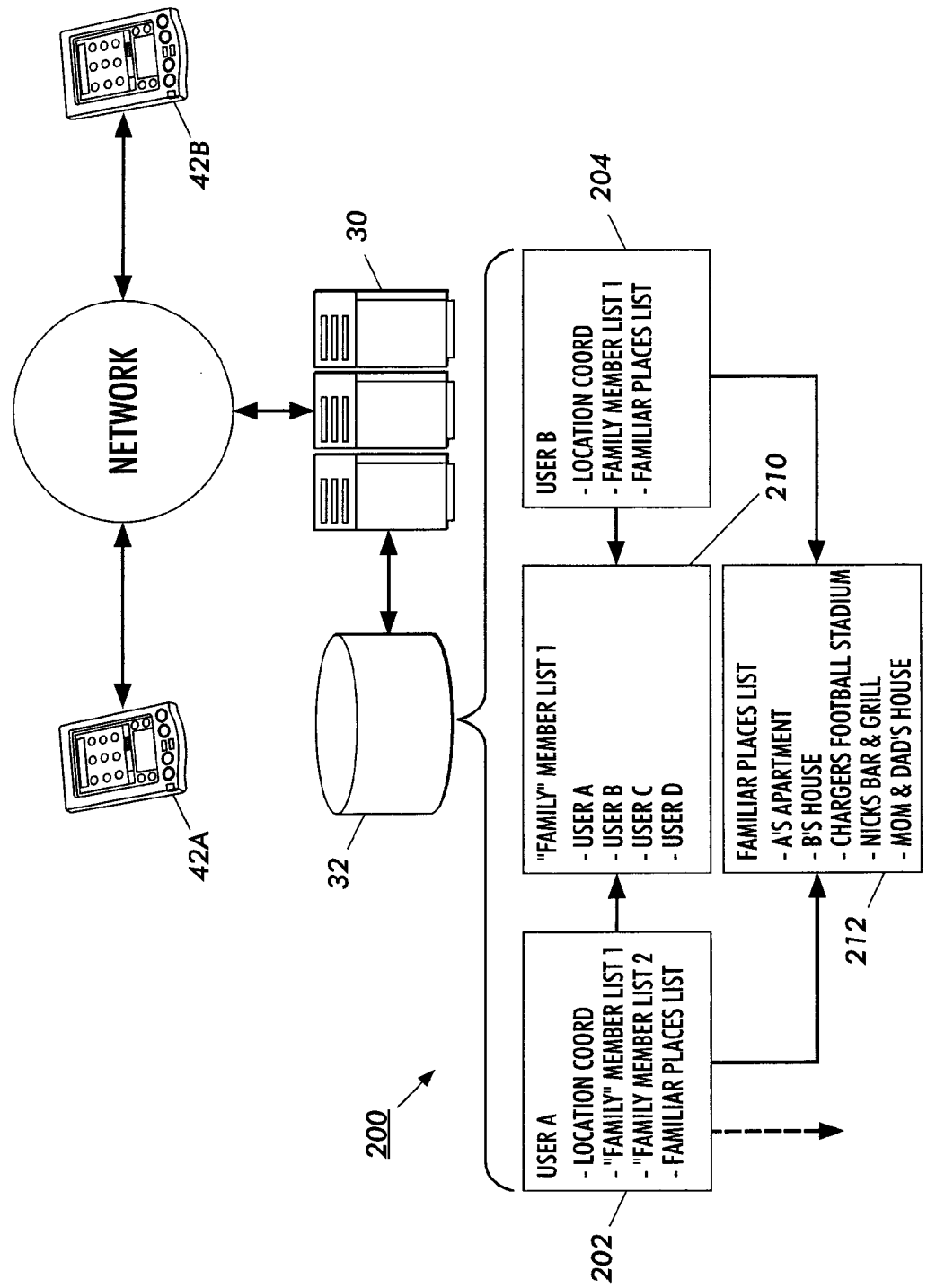
FIG. 7 is a schematic illustration of an exemplary database structure in association with a network and user-interfaces depicting an embodiment of the present invention.

Yet another alternative embodiment is depicted in FIG. 7, where two or more users having network connectivity (e.g., network-connected PDA's (42a, 42b), computers, pagers or cellular telephones) are identified as being compatible. In such a system, compatibility is not necessarily tied to personal characteristics as much as it is to relationships or location. For example, a group of two or more users having devices 42a and 42b may be identified as a "family" group and records 202 and 204, respectively indicating the members of the family group, may be included in a database 200 as stored on disk 32 described above. Periodically checking the records, the IDPP system, based upon the positional information provided by a global-positioning system (GPS) or similar device such as cellular phone technology (triangulation), could determine when family members were in proximity to one another, or at a pre-designated location.

As a more specific example, consider a User A, having device 42a, who is traveling on business and plans to stop by her parents home. The location of User A is periodically or continuously monitored, and when it is determined that A is at or near the parent's home, as indicated by coordinates associated with the "Mom & Dad's House" record in database table 212, User B might be paged as he was trying to contact A when she arrived.

Figure 8:
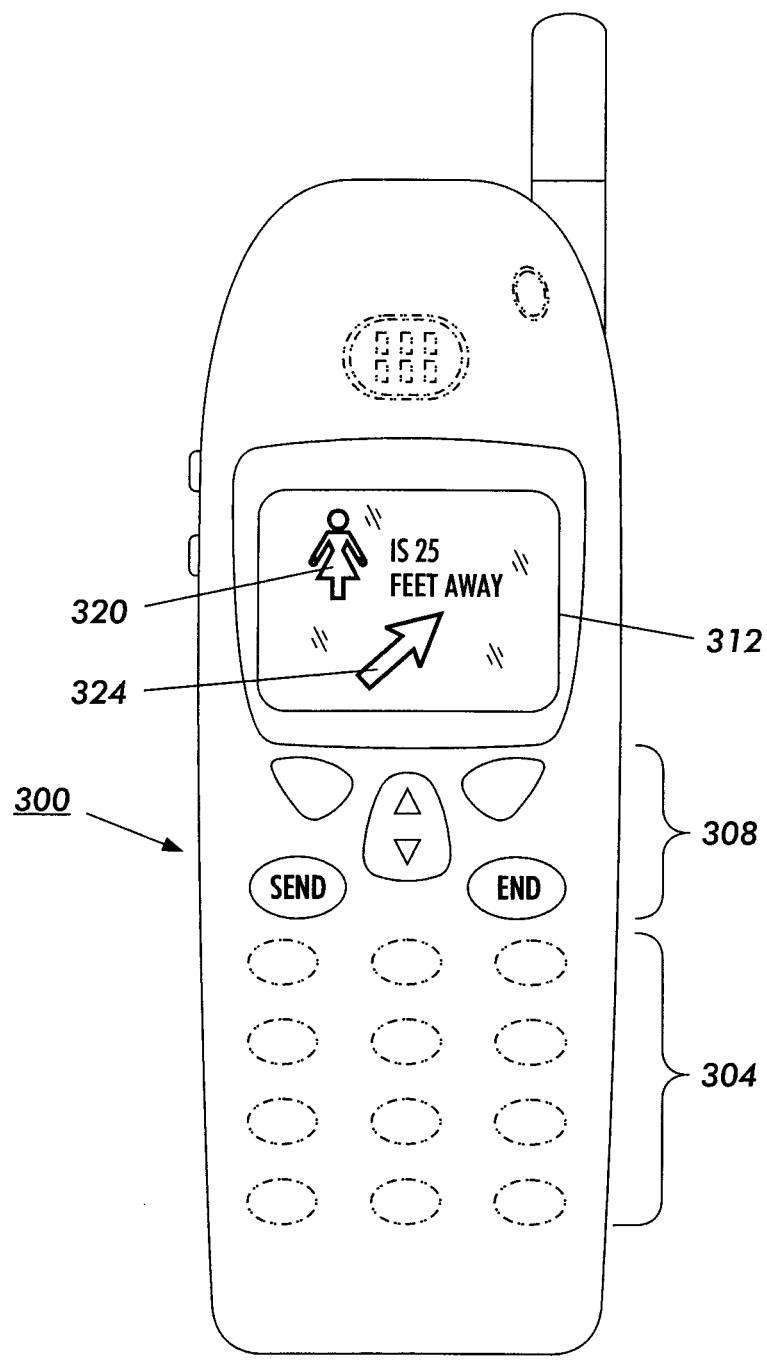
FIG. 8 is an enlarged view of the PDA of FIG. 7, illustrating an exemplary user-interface screen.

Alternatively, the positioning information may be used to evaluate compatibility based not only on "family" membership, but also on the proximity of two or more family members. Using the "nearby" setting in the database (a programmable function that allows users to specify the level of proximity (e.g., 100 feet, ¼ mile, same city, etc.)) the system would notify the members (User A and User B) when they were nearby. Here again, notification may be accomplished by a paging signal (pager), an automatic call (cell phone) or similar means (PDA & computers) for example as depicted in the interface of the PDA shown in FIG. 8. There, a hand-held phone (cellular, digital) 300 is depicted that includes a touch keypad 304, selection/navigations keys 308, and a display 312, which may be a liquid crystal display (LCD) or similar graphic display device responsive to digital signals. As is well-known, such telephones include an antenna 316 as well as circuitry (not shown) to control both the operation of the phone and communication with a central network through a communications channel. In the phone 300 of FIG. 8, the display region 312 includes a visual representation of another chatter or "family member," figure 320, textual description of the proximity of the other party in region 322 and optionally a graphical indication 324 of the direction of the other party (for phones that include GPS or similar functionality that could determine the orientation of the phone at any particular time). Aspects of such a device are taught, for example, in U.S. Pat. No. 5,952,959 to Norris, issued Sep. 14, 1999, and by U.S. Pat. No. 5,613,205 to Dufour, issued Mar. 18, 1997, both of which are hereby incorporated by reference in their entirety for their teachings.

It will be further appreciated that a user may be a member of more than one family, or that "families" have subsets or alternative familiar places that may be selected by one or more users. Also, two users may be considered to be members of a "family" based solely upon compatible characteristics as previously described with respect to IDPP, even though the parties involved may not actually know one another. As a result of an aspect of this invention, it is thus conceivable that a first chatter in the bar may introduce himself to another person in the same bar as a result of a prompt or page based upon information provided as part of a profile.

Moreover, the present invention contemplates the application of the IDPP technology to a cellular phone, PDA or other wireless communication technology. Accordingly, this application does not necessarily have to include a chat room, but use of the IDPP capability may be provided to any network subscriber, where the application is geared towards the paging process for direct communication (talking directly to a person after the person is identified with the paging process).

In recapitulation, the present invention is a method and system for using predetermined preferences/characteristics to ascertain personal compatibility between chat room or other network participants. When the system determines that these preferences are favorable for interpersonal compatibility, the system will automatically notify or page the chatters so as to facilitate their introduction, either on-line or personally. Further functionality, aside from the compatibility based upon profile information, includes e-mail and other electronic notification of personal compatibility as well as geographic compatibility.

It is, therefore, apparent that there has been provided, in accordance with the present invention, a method and apparatus for a network-based chat room system, and more particularly to an intelligent system and method for "paging" a chat room participant based upon information relating to that participant's characteristics. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A method for the automated display of human participant-specific data to a human participant of a real-time network, comprising the steps of:
(a) collecting human participant specific data for a plurality of network participants, wherein said step of collecting human participant-specific data includes presenting to the human participant at least one on-line survey comprising a plurality of questions and detecting and recording the human participant responses to the questions and, if applicable, the participant-specific data further includes whether the human participant has indicated a wireless device, capable of generating positional information, as being associated with the human participant;
(b) processing the recorded human participant responses to the questions, to identify at least one facet of the human participant's personality;
(c) storing, in memory, at least a portion of the human participant specific data collected and the at least one facet of the human participant's personality;
(d) processing the stored human participant specific data and the at least one facet, to determine interpersonal compatibility between at least two network participants;
(e) sorting said human participant specific data from a plurality of network participants by interpersonal compatibility wherein interpersonal compatibility includes whether the wireless device is associated with the human participant; and
(f) automatically displaying at least a portion of the sorted human participant specific data to at least one participant in association with the network including an indication of the relative position of the wireless device for at least one compatible participant.

2. The method according to claim 1 where, if applicable, the participant-specific data further includes position information for the wireless device associated with the human participant, and
wherein displaying human participant-specific data further includes displaying participants' proximity, where proximity is determined, at least in part, based upon position information for the wireless devices associated with the compatible human participants.

3. The method according to claim 2 where the proximity is displayed only for compatible human participants within a specified level of proximity.

4. The method according to claim 2 wherein displaying human participant-specific data further includes a textual description of the proximity of at least one other participant.

5. The method according to claim 2 wherein displaying human participant-specific data further includes a graphical indication of the direction of at least one other participant.

6. A method for the automated display of human participant-specific data to a human participant of a real-time network, comprising:
collecting human participant-specific data for a plurality of network participants, wherein collecting human participant-specific data includes presenting to the human participant an on-line survey comprising a plurality of questions; and detecting and recording the human participant responses to the questions and, if applicable, the participant-specific data further includes whether the human participant has indicated a wireless device, capable of generating positional information, as being associated with the human participant;

storing, in computer memory, the human participant-specific data collected, wherein storing the collected human participant-specific data includes creating at least one data table within a database that includes data for a plurality of human participants, and within said table storing at least one record containing information indicative of the human participant responses to the questions;

processing the stored human participant-specific data, using compatibility criteria, to determine interpersonal compatibility between at least two network participants, wherein processing the stored human participant-specific data includes retrieving at least one compatibility criteria, and applying the compatibility criteria to a plurality of records containing information indicative of the human participant responses in the at least one data table to determine the compatibility of the human participants;

sorting said human participant-specific data from a plurality of network participants by interpersonal compatibility, wherein interpersonal compatibility includes whether the wireless device is associated with the human participant; and automatically displaying at least a portion of the sorted human participant-specific data to at least one participant determined to be compatible, including an indication of the relative position of the wireless device for compatible participants.

7. The method according to claim 6 where, if applicable, the participant-specific data further includes position information for the wireless device associated with the human participant, and wherein displaying human participant-specific data further includes displaying participants' proximity, where proximity is determined, at least in part, based upon position information for the wireless devices associated with the compatible human participants.

8. The method according to claim 7 where the proximity is displayed only for compatible human participants within a specified level of proximity.

9. The method according to claim 7 wherein displaying human participant-specific data further includes a textual description of the proximity of at least one other participant.

10. The method according to claim 7 wherein displaying human participant-specific data further includes a graphical indication of the direction of at least one other participant.

* * * * *